United States Patent
Rapp et al.

(10) Patent No.: US 9,037,959 B2
(45) Date of Patent: May 19, 2015

(54) FORMULA DISPLAY AND SEARCH IN A SPREADSHEET

(75) Inventors: Peter William Rapp, Pittsburgh, PA (US); Shou-Shan Yeh, Export, PA (US); Christopher Douglas Weeldreyer, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 1225 days.

(21) Appl. No.: 12/286,603

(22) Filed: Sep. 30, 2008

(65) Prior Publication Data
US 2010/0083079 A1 Apr. 1, 2010

(51) Int. Cl.
*G06F 17/00* (2006.01)
*G06F 17/24* (2006.01)

(52) U.S. Cl.
CPC .................... *G06F 17/246* (2013.01)

(58) Field of Classification Search
CPC ................ G06F 17/246; G06F 17/215
USPC .................................................. 715/212–220
See application file for complete search history.

(56) References Cited

U.S. PATENT DOCUMENTS

| | | | |
|---|---|---|---|
| 5,255,356 A * | 10/1993 | Michelman et al. ........... | 715/217 |
| 5,471,612 A * | 11/1995 | Schlafly ...................... | 715/210 |
| 5,708,827 A * | 1/1998 | Kaneko et al. ................ | 715/219 |
| 5,727,161 A * | 3/1998 | Purcell, Jr. .................... | 705/7.36 |
| 5,742,835 A * | 4/1998 | Kaethler ...................... | 715/219 |
| 5,890,174 A * | 3/1999 | Khanna et al. ................ | 715/210 |
| 6,185,582 B1 * | 2/2001 | Zellweger et al. ............ | 715/212 |
| 6,199,078 B1 * | 3/2001 | Brittan et al. ................. | 715/234 |
| 6,256,649 B1 * | 7/2001 | Mackinlay et al. ........... | 715/212 |
| 6,317,758 B1 * | 11/2001 | Madsen et al. ................ | 715/220 |
| 6,460,059 B1 * | 10/2002 | Wisniewski .................. | 715/212 |
| 7,155,667 B1 * | 12/2006 | Kotler et al. .................. | 715/210 |
| 7,506,242 B2 * | 3/2009 | Kotler et al. .................. | 715/209 |
| 7,533,139 B2 * | 5/2009 | Jones et al. ................... | 708/200 |
| 8,015,481 B2 * | 9/2011 | Jager et al. ................... | 715/212 |
| 8,239,751 B1 * | 8/2012 | Rochelle et al. ............. | 715/220 |
| 2002/0023105 A1 * | 2/2002 | Wisniewski .................. | 707/503 |
| 2002/0091728 A1 * | 7/2002 | Kjaer et al. ................... | 707/503 |
| 2002/0169799 A1 * | 11/2002 | Voshell ......................... | 707/503 |
| 2003/0056181 A1 * | 3/2003 | Marathe ........................ | 715/538 |
| 2004/0237029 A1 * | 11/2004 | Medicke et al. ............. | 715/503 |
| 2006/0080594 A1 * | 4/2006 | Chavoustie et al. .......... | 715/503 |
| 2006/0122807 A1 * | 6/2006 | Wittkowski .................. | 702/179 |
| 2006/0271841 A1 * | 11/2006 | Thanu et al. .................. | 715/503 |
| 2007/0033519 A1 * | 2/2007 | Zdenek ......................... | 715/503 |
| 2007/0220415 A1 * | 9/2007 | Cheng et al. .................. | 715/503 |
| 2007/0256006 A1 * | 11/2007 | Meyers ......................... | 715/511 |
| 2007/0260667 A1 * | 11/2007 | Duzak et al. .................. | 708/521 |
| 2009/0113283 A1 * | 4/2009 | Sol et al. ....................... | 715/212 |
| 2012/0131042 A1 * | 5/2012 | Mosimann et al. ........... | 707/769 |

OTHER PUBLICATIONS

Walkenbach, John, Excel 2007 Bible, Jan. 2007, John Wiley & Son, pp. 491-497, 551-569.*

* cited by examiner

*Primary Examiner* — Kavita Padmanabhan
*Assistant Examiner* — Benjamin J Smith
(74) *Attorney, Agent, or Firm* — Morgan, Lewis & Bockius LLP

(57) ABSTRACT

In some embodiments, a spreadsheet application provides an option for collectively displaying the formulas associated with a set of cells in a separate view. In some embodiments, the view provides an option to search within the formulas (and/or other content) provided by the view. In some embodiments, a find and replace user interface of a spreadsheet application includes an option to search only in formulas.

18 Claims, 5 Drawing Sheets

200

| Formula List | Find & Replace... | | |
|---|---|---|---|
| Location | Results | Formula | |
| ▼ Mortgage Calculator | | | |
| ▼ Mortgage Details | | | |
| B3 | $50,000 | =B1*B2 | |
| B4 | $450,000 | =B1-B3 | |
| B7 | $2,698 | =-PMT(B5/12,B6*12,B4) | |
| ▼ Possible Payments | | | |
| A2 | $400,000 | =A3-C7 | |
| A3 | $425,000 | =A4-C7 | |
| A4 | $450,000 | =Mortgage Details::B4 | |
| A5 | $475,000 | =A4+C7 | |
| A6 | $500,000 | =A5+C7 | |
| B1 | 5.50% | =C1-F7 | |
| B2 | $2,271 | =-PMT(B$1/12,Mortgage Details::$B$6*12,$A2) | |

FIG. 1A (Prior Art)

|   | A | B | C | D | E | F |
|---|---|---|---|---|---|---|
| 1 | STUDENT ID | EXAM 1 | EXAM 2 | FINAL | GRADE | LETTER GRADE |
| 2 | 123456 | 87 | 74 | 65 | 72.75 | C |
| 3 | 346752 | 86 | 73 | 88 | 83.75 | B |
| 4 | 385703 | 92 | 87 | 89 | 89.25 | B |
| 5 | 570938 | 77 | 83 | 78 | 79 | C |
| 6 | 673920 | 98 | 100 | 95 | 97 | A |
| 7 | 735894 | 62 | 66 | 74 | 69 | D |
| 8 |   |   |   |   |   |   |
| 9 | AVG. SCORE | 83.66667 | 80.5 | 81.5 |   |   |

FIG. 1B (Prior Art)

|    | A | B | C | D | E | F |
|----|---|---|---|---|---|---|
| 1  | STUDENT ID | EXAM 1 | EXAM 2 | FINAL | GRADE | LETTER GRADE |
| 2  | 123456 | 87 | 74 | 65 | =(B2+C2+2*D2)/4 | C |
| 3  | 346752 | 86 | 73 | 88 | =(B3+C3+2*D3)/4 | B |
| 4  | 385703 | 92 | 87 | 89 | =(B4+C4+2*D4)/4 | B |
| 5  | 570938 | 77 | 83 | 78 | =(B5+C5+2*D5)/4 | C |
| 6  | 673920 | 98 | 100 | 95 | =(B6+C6+2*D6)/4 | A |
| 7  | 735894 | 62 | 66 | 74 | =(B7+C7+2*D7)/4 | D |
| 8  |   |   |   |   |   |   |
| 9  | AVG. SCORE | =AVERAGE(B2:B8) | =AVERAGE(C2:C7) | =AVERAGE(D2:D7) |   |   |
| 10 |   |   |   |   |   |   |

| Formula List | Find & Replace... | |
|---|---|---|
| Location | Results | Formula |
| ▼ Mortgage Calculator | | |
| ▼ Mortgage Details | | |
| B3 | $50,000 | =B1*B2 |
| B4 | $450,000 | =B1-B3 |
| B7 | $2,698 | =-PMT(B5/12,B6*12,B4) |
| ▼ Possible Payments | | |
| A2 | $400,000 | =A3-C7 |
| A3 | $425,000 | =A4-C7 |
| A4 | $450,000 | =Mortgage Details::B4 |
| A5 | $475,000 | =A4+C7 |
| A6 | $500,000 | =A5+C7 |
| B1 | 5.50% | =C1-F7 |
| B2 | $2,271 | =-PMT(B$1/12,Mortgage Details::$B$6*12,$A2) |

FIG. 2

Find & Replace

Find: [2]

- Entire Document
- Current Sheet Only
- Formulas Only

☐ Match case
☐ Whole words

Replace:

1 Found

☐ Repeat search (loop)

[Replace All] [Replace] [Replace & Find] [Previous] [Next]

FIG. 4

FORMULA DISPLAY AND SEARCH IN A SPREADSHEET

BACKGROUND OF THE INVENTION

Existing spreadsheet applications provide a view in which cell formulas are expanded, i.e., a formula as opposed to a result computed based on the formula is shown in a cell in which the formula was entered, with the cell/column size being expanded if needed to show the entire formula. FIG. 1A illustrates an example of a view of a prior art spreadsheet application in which values or results of formulas are displayed in cells that contain formulas. FIG. 1B illustrates a prior art view of the same data in which the formulas are expanded. As depicted, cell dimensions are expanded as needed to accommodate the length of the formulas in this view.

Existing spreadsheet applications also provide a search option by which both the values and the formulas of cells may be searched for a specified value.

BRIEF DESCRIPTION OF THE DRAWINGS

Various embodiments of the invention are disclosed in the following detailed description and the accompanying drawings.

FIG. 1A illustrates an example of a view of a prior art spreadsheet application in which values or results of formulas are displayed.

FIG. 1B illustrates a prior art view of the data of FIG. 1A in which the formulas are expanded.

FIG. 2 illustrates an embodiment of a formula view.

FIG. 4 illustrates an embodiment of a find and replace user interface that provides an option for exclusively searching within formulas.

DETAILED DESCRIPTION

Figure 3:
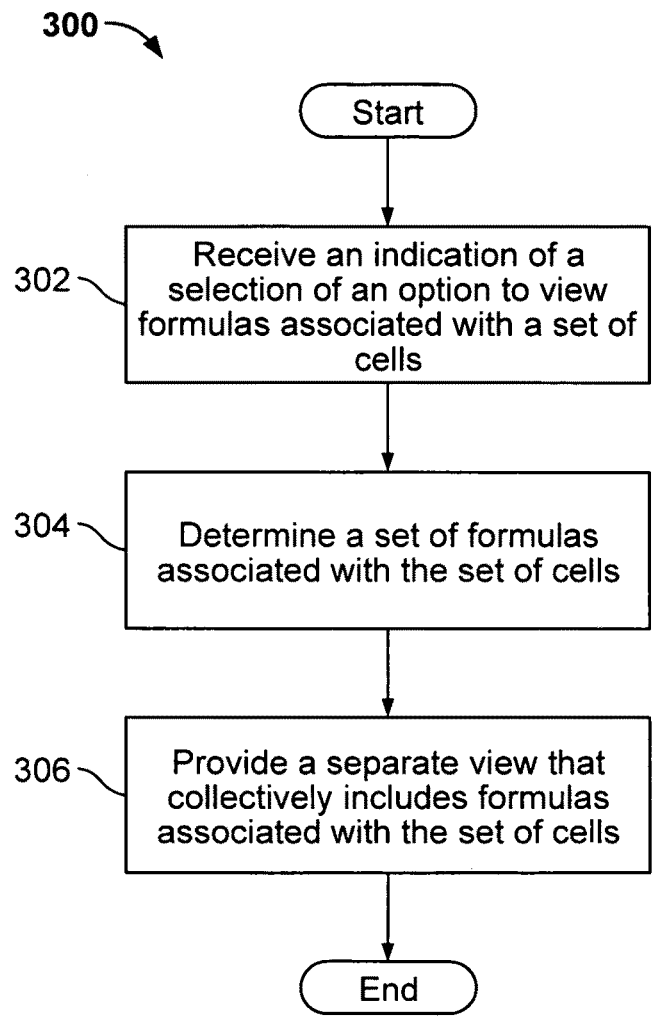
FIG. 3 illustrates an embodiment of a process for providing formulas.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well as any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

Collectively providing formulas associated with a set of cells in a separate view is disclosed. In some embodiments, an option to view the formulas associated with a set of cells is provided, which when selected displays the formulas associated with the set of cells in a view that is separate from a view associated with the set of cells so that the view associated with the set of cells is not affected. The separate view collects all of the formulas associated with the set of cells into a single viewing location. Such a formula view may be useful, for example, for quick auditing of the formulas, error checking of the formulas, etc. In some embodiments, the view comprises a user interface with one or more associated options.

FIG. 2 illustrates an embodiment of a formula view 200 associated with a set of cells. Formula view 200 comprises a collection of formulas associated with a set of cells (not shown) with respect to which a formula view option was selected. In various embodiments, a formula view may be provided as a separate window or as a split screen so that, for example, the associated set of cells can be simultaneously viewed and/or accessed if desired. In various embodiments, in addition to formulas, a formula view may include additional information associated with each formula. In the given example, for each formula, formula view 200 provides an associated formula value (i.e., result) and cell location.

Formulas may be organized in a formula view in any appropriate manner. In some embodiments, a formula view comprises a list that groups formulas based on one or more hierarchical divisions. The formulas in formula view 200 are hierarchically organized based on location. In the given example, locations within a spreadsheet document are hierarchically arranged into sheets (e.g., "Mortgage Calculator"), tables ("Mortgage Details", "Possible Payments"), and cells of tables ("B3", "B4", and "B7" in table "Mortgage Details" and "A2", "A3", "A4", "A5", "A6", "B1", and "B2" in table "Possible Payments"). A hierarchical division within a formula view may be expandable and/or collapsible as depicted in the given example.

In some embodiments, a formula view includes one or more search options, such as a search input field and/or a find and replace option. Formula view 200 in FIG. 2, for example, includes a search input field 202 which can be employed to specify a search with respect to one or more of the Formula, Results, and/or Location columns. In some embodiments, search input field 202 is associated with only searching within the presented formulas (i.e., the Formula column). In some embodiments, a search option associated with searching the content included in a formula view comprises a find and replace option.

In some embodiments, a formula view allows editing of formulas within the view. In some such cases, any changes resulting from editing a formula are automatically reflected in the value and/or formula of the associated cell and in the formula view (e.g., the result column is updated as applicable). In some embodiments, an associated cell may be navigated to by clicking on or otherwise selecting an associated formula, formula result, and/or formula location in the formula view.

FIG. 3 illustrates an embodiment of a process for providing formulas. In some embodiments, process 300 is employed to provide formula view 200 of FIG. 2. Process 300 starts at 302 at which an indication of a selection of an option to view formulas associated with a set of cells is received. In various embodiments, the set of cells comprises cells included in one or more tables, cells included in one or more sheets or canvases of a document, and/or cells included in one or more documents. At 304, a set of formulas associated with the set of cells is determined. At 306, a separate view that collectively includes formulas associated with the set of cells (if any formulas are associated with the set of cells) is provided. Process 300 subsequently ends. In some embodiments, the view is separate from a primary view associated with the set of cells. In some embodiments the formula view can be (separately) printed.

The formula view described in the given examples allows the formulas of a set of cells to be collectively presented in a separate view. Although examples of various features that may be associated with a formula view are provided, in various embodiments, a formula view may be implemented in any appropriate manner.

In some embodiments, a find and/or replace user interface associated with a spreadsheet application includes an option to only search and/or replace within formulas. In various embodiments, an exclusive formula search (and/or replace) may be conducted with respect to one or more documents, one or more sheets, one or more tables, with respect to a specified set of cells, etc. FIG. 4 illustrates an embodiment of a find and replace user interface 400 that provides an option for searching only within formulas. In some embodiments, a find and/or replace user interface, such as find and replace interface 400, may be accessed via a formula view such as via 204 in formula view 200.

Figure 5:
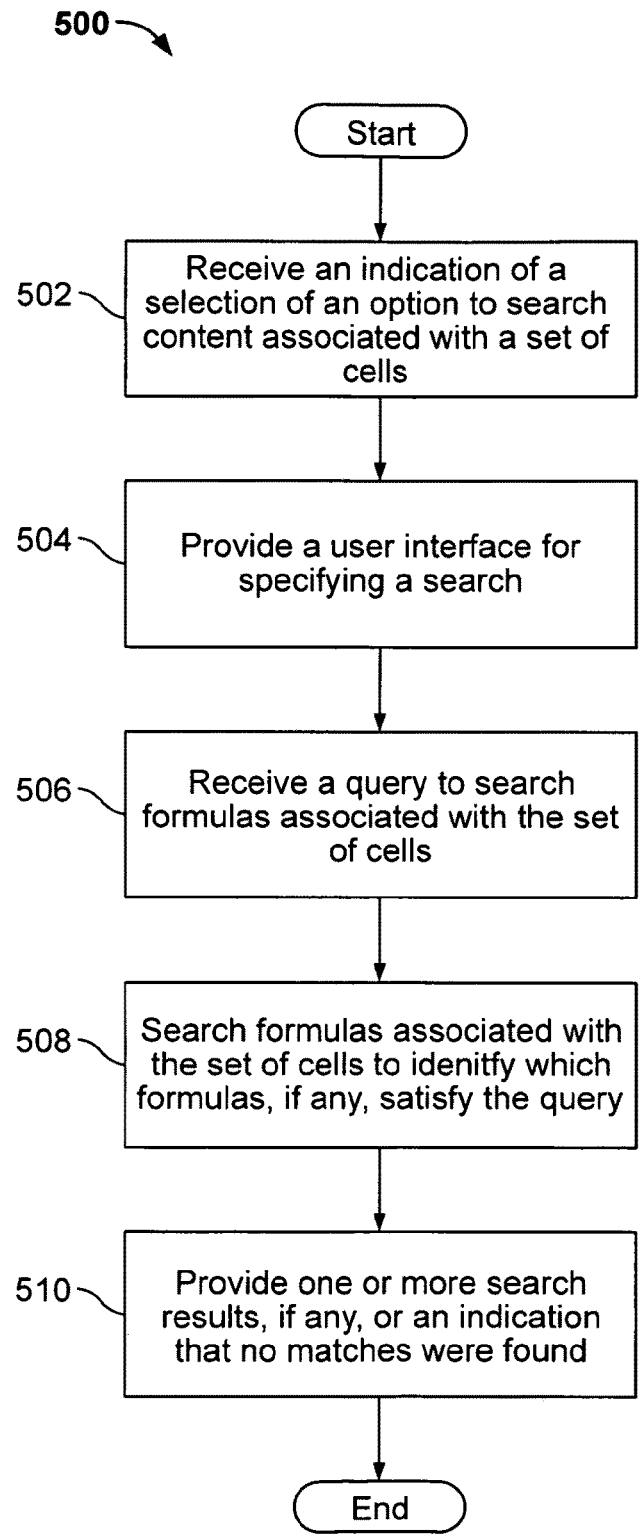
FIG. 5 illustrates an embodiment of a process for searching in a spreadsheet application.

FIG. 5 illustrates an embodiment of a process for searching in a spreadsheet application. Process 500 starts at 502 at which an indication of a selection of an option to search content associated with a set of cells is received. At 504, a user interface for specifying a search is provided. In some embodiments, the user interface includes an option to search only within formulas. At 506, a query to search formulas associated with the set of cells is received. For example, the query may specify to search formulas but not values (or comments or other data) associated with the set of cells. At 508, formulas associated with the set of cells (but not values, comments, and/or other data associated with the set of cells) are searched to identify which formulas, if any, satisfy the query. At 510, one or more search results are provided, if any, or an indication that no matches were found is provided. Process 500 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product comprising a non-transitory computer readable storage medium storing a plurality of instructions, that when executed by a computing device having a display and an input device, cause the computing device to perform operations for processing a set of cells in a spreadsheet application, the operations comprising:
    displaying, on the display, a portion of a spreadsheet, wherein the spreadsheet includes:
        a first cell at a first cell location in a first table of the spreadsheet, wherein the first cell includes a first value determined based on a first formula, and
        a second cell at a second cell location in a second table of the spreadsheet, wherein the second cell includes a second value determined based on a second formula; and
    while displaying the portion of the spreadsheet on the display:
        detecting, with the input device, an input corresponding to a request to concurrently display formula information for the first cell and the second cell; and
        in response to detecting the input, displaying, on the display, formula view, wherein displaying the formula view includes concurrently displaying:
            a cell location column that includes the first cell location for the first cell and the second cell location for the second cell,
            a cell value column that includes the first value and the second value, and
            a cell formula column that includes the first formula and the second formula, the cell location column being distinct from the cell formula column, wherein the formula view is grouped based on one or more of the following hierarchical divisions: documents, sheets or canvases, tables, rows of a table, columns of a table, and cells of a table.

2. The computer program product recited in claim 1, wherein displaying the portion of the spreadsheet comprises displaying a primary view in a user interface of the spreadsheet application.

3. The computer program product recited in claim 1, wherein:
    the spreadsheet is a multi-sheet spreadsheet;
    the first cell is in a first sheet of the spreadsheet; and
    the second cell is in a second sheet of the spreadsheet.

4. The computer program product recited in claim 1, wherein the formula view comprises a list.

5. The computer program product recited in claim 1, wherein the formula view includes options to expand or collapse one or more of the hierarchical divisions.

6. The computer program product recited in claim 1, wherein the formula view is hierarchically presented in a user interface based on a plurality of hierarchical divisions of the cells in the portion of the spreadsheet.

7. The computer program product recited in claim 1, wherein the formula view comprises a user interface that includes one or more options for manipulating data presented in the formula view.

8. A system for processing a set of cells in a spreadsheet application, the system comprising:
- a processor;
- a display;
- an input device; and
- a memory having instructions stored thereon that when executed by the processor, cause the processor to:
  display, on the display a portion of a spreadsheet, wherein the spreadsheet includes:
   a first cell at a first cell location in a first table of the spreadsheet, wherein the first cell includes a first value determined based on a first formula, and
   a second cell at a second cell location in a second table of the spreadsheet, wherein the second cell includes a second value determined based on a second formula; and
  while displaying the portion of the spreadsheet on the display:
   detect, with the input device, an input corresponding to a request to concurrently display formula information for the first cell and the second cell; and
   in response to detecting the input, display, on the display, formula view, wherein displaying the formula view includes concurrently displaying:
    a cell location column that includes the first cell location for the first cell and the second cell location for the second cell,
    a cell value column that includes the first value and the second value, and
    a cell formula column, that includes the first formula and the second formula, the cell location column being distinct from the cell formula column, wherein the formula view is grouped based on one or more of the following hierarchical divisions: documents, sheets or canvases, tables, rows of a table, columns of a table, and cells of a table.

9. The system recited in claim 8, wherein displaying the portion of the spreadsheet comprises displaying a primary view in a user interface of the spreadsheet application.

10. The system recited in claim 8, wherein the formula view is hierarchically presented in a user interface based on a plurality of hierarchical divisions of the cells in the portion of the spreadsheet.

11. The system recited in claim 8, wherein:
the spreadsheet is a multi-sheet spreadsheet;
the first cell is in a first sheet of the spreadsheet; and
the second cell is in a second sheet of the spreadsheet.

12. The system recited in claim 8, wherein the formula view comprises a list.

13. The system recited in claim 8, wherein the formula view includes options to expand or collapse one or more of the hierarchical divisions.

14. The system recited in claim 8, wherein the formula view comprises a user interface that includes one or more options for manipulating data presented in the formula view.

15. A computer implemented method for processing a set of cells in a spreadsheet application, the method comprising:
  displaying, on the display, a portion of a spreadsheet, wherein the spreadsheet includes:
   a first cell at a first cell location in a first table of the spreadsheet, wherein the first cell includes a first value determined based on a first formula, and
   a second cell at a second cell location in a second table of the spreadsheet, wherein the second cell includes a second value determined based on a second formula; and
  while displaying the portion of the spreadsheet on the display:
   detecting, with the input device, an input corresponding to a request to concurrently display formula information for the first cell and the second cell; and
   in response to detecting the input, displaying, on the display, a formula view, wherein displaying the formula view includes concurrently displaying:
    a cell location column that includes the first cell location for the first cell and the second cell location for the second cell,
    a cell value column that includes the first value and the second value, and
    a cell formula column that includes the first formula and the second formula, the cell location column being distinct from the cell formula column, wherein the formula view is grouped based on one or more of the following hierarchical divisions: documents, sheets or canvases, tables, rows of a table, columns of a table, and cells of a table.

16. The method recited in claim 15, wherein displaying the portion of the spreadsheet comprises displaying a primary view in a user interface of the spreadsheet application.

17. The method recited in claim 15, wherein the formula view comprises a user interface that includes one or more options for manipulating data presented in the formula view.

18. The method recited in claim 15, wherein the formula view comprises a list.

* * * * *